Oct. 21, 1930.                J. SEEDERER                1,779,263
                               SCALE BEAM
                            Filed May 29, 1928
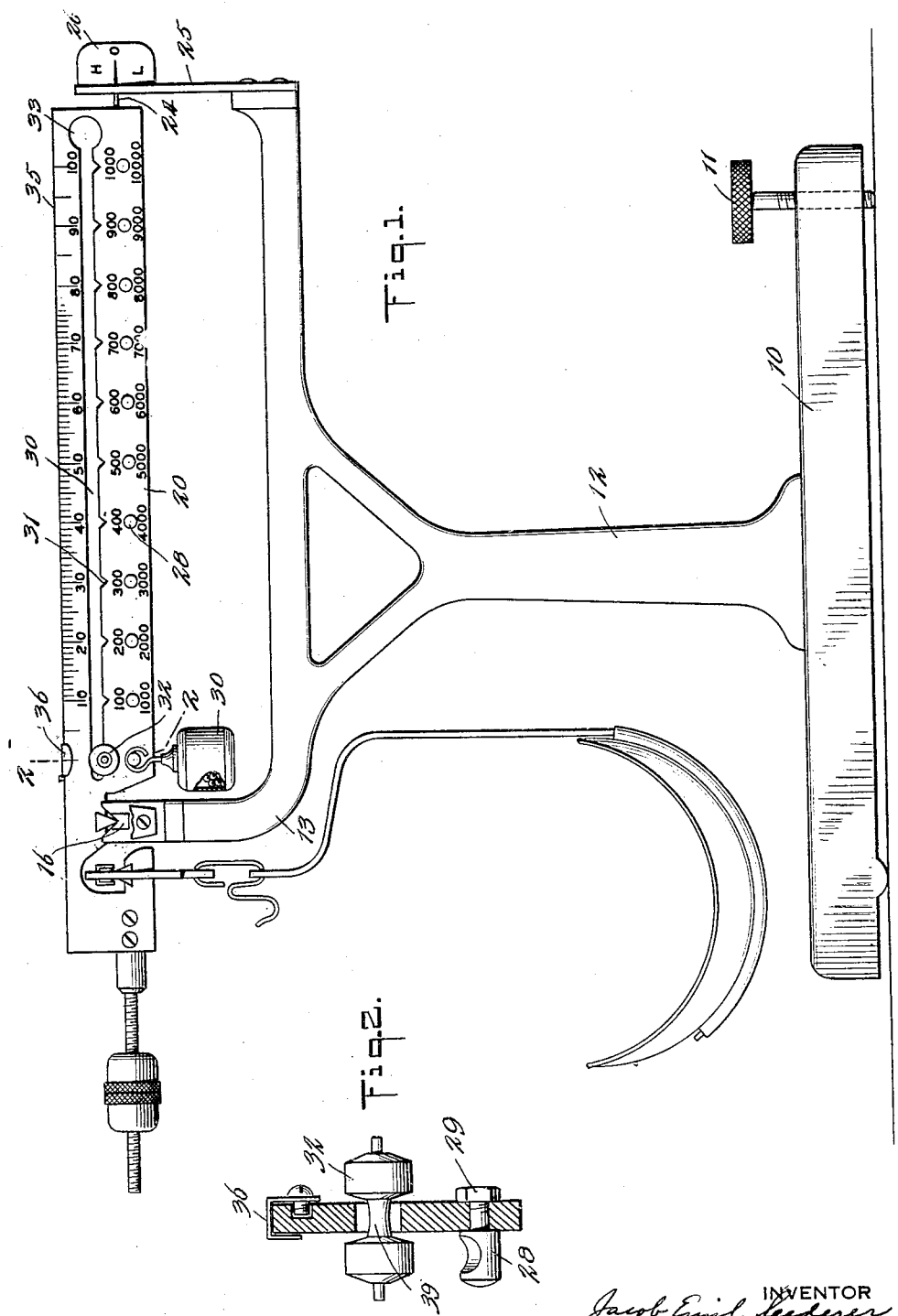
INVENTOR
Jacob Emil Seederer
BY
ATTORNEY Patented Oct. 21, 1930

1,779,263

UNITED STATES PATENT OFFICE

JACOB EMIL SEEDERER, OF JERSEY CITY, NEW JERSEY, ASSIGNOR TO SEEDERER-KOHLBUSCH, INC., OF JERSEY CITY, NEW JERSEY, A CORPORATION OF NEW JERSEY

SCALE BEAM

Application filed May 29, 1928. Serial No. 281,492.

This invention relates to a beam scale and has for its object to improve upon the scale shown in my Patent 1,672,735 dated June 5, 1928, by adding thereto a further series of graduations whereby still smaller fractions of units of weight can be quickly and accurately measured.

According to this invention, I retain as in said patent the lower scale with adjustable knife edge pivots, and add intermediate said lower scale and upper finest graduated scale an intermediate scale. This permits the upper scale, without increase of graduations, to indicate the smaller units.

In a delicate scale of this type, it is essential for quickness and accuracy that the poises be not only quickly but accurately adjustable. Accuracy and quickness of the lower poise is secured as in said patent. Accuracy and quickness of the intermediate poise is secured according to this invention by slotting and graduating by notches the intermediate portion of the beam, and providing a rolling poise similar to a spool which can readily be moved from place to place and will hold its position in the notches. Owing to the relatively small number of notches, balancing is easily and conveniently effected where necessary by hand filing, in which the workers in this art become expert.

In the accompanying drawing,

Fig. 1 is an elevation of a scale embodying the invention, and

Fig. 2 is a partial section on the line 2—2 of Fig. 1, the large poise being omitted.

10 is the base, 11 a levelling screw, and 12 a pedestal having at one end an upright arm 13 supporting knife edge bearing 16, as in said patent aforesaid. The mounting of the beam 20 is as shown in said patent and does not require detailed description here. Also, this beam carries pointer 24 moving over scale 26 carried on upright 25.

The beam 20 carries adjustable knife edges 28 similar to studs, and held by nuts 29, to support the main poise 30. Below each knife edge are figures indicating fractions of units.

Intermediate the beam 20 is a slot 30 having equally spaced notches 31, the bottom of the slot forming a track on which the movable secondary poise 32 in the form of a spool can roll, the spindle 39 being such diameter relatively to the size of the notch as to fit therein and hold during vibration of the beam. This secondary poise 32 and the graduations under the notches may, for example, represent larger fractions or units weight. The secondary poise 32 is inserted in the slot 30 through hole 33 at one end of the slot beyond the graduations. In balancing up the beam thus far the notches 31 can at first be cut by machine and then easily filed where necessary for exact balance throughout.

35 is the top bar of the beam having graduations thereon as shown with which cooperate the tertiary poise 36, which is very light and slides easily along the top. The graduations on scale 35 are, for example, 1/10 of those on the intermediate scale, and 1/100 of those on the lower scale, so that by the three scales a very fine weighing is very quickly obtainable.

I claim:

1. A scale beam having a longitudinal intermediate slot, knife edge poise pivots below the slot, notches in the slot, and upper graduations correlated with said notches.

2. A scale beam having a longitudinal intermediate slot, knife edge poise pivots below the slot, notches in the slot, a rolling poise in the slot and cooperating with said notches, and upper graduations correlated with said notches.

3. A scale beam having a longitudinal intermediate slot, notches in the slot, and adjustable knife edge pivots below the slot correlated with said notches.

4. A scale beam having a longitudinal intermediate slot, notches in the slot, and adjustable knife edge pivots correlated with said notches.

Signed at Jersey City, in the county of Hudson and State of New Jersey this 24th day of May, A. D. 1928.

JACOB EMIL SEEDERER.